United States Patent
Miles et al.

(10) Patent No.: US 8,887,128 B2
(45) Date of Patent: Nov. 11, 2014

(54) COMPUTER-IMPLEMENTED SYSTEMS AND METHODS FOR AUTOMATED GENERATION OF A CUSTOMIZED SOFTWARE PRODUCT

(71) Applicant: SAS Institute Inc., Cary, NC (US)

(72) Inventors: Brian Oneal Miles, Cary, NC (US); Julius Alton King, Cary, NC (US); Adheesha Sanjaya Arangala, Chapel Hill, NC (US); Jin-Whan Jung, Chapel Hill, NC (US)

(73) Assignee: SAS Institute Inc., Cary, NC (US)

( * ) Notice: Subject to any disclaimer, the term of this patent is extended or adjusted under 35 U.S.C. 154(b) by 67 days.

(21) Appl. No.: 13/834,076

(22) Filed: Mar. 15, 2013

(65) Prior Publication Data

US 2014/0173550 A1     Jun. 19, 2014

Related U.S. Application Data

(60) Provisional application No. 61/737,908, filed on Dec. 17, 2012.

(51) Int. Cl.
*G06F 9/44*     (2006.01)

(52) U.S. Cl.
CPC ........................................ *G06F 8/20* (2013.01)
USPC ........... 717/106; 717/100; 717/107; 707/791; 707/793

(58) Field of Classification Search
None
See application file for complete search history.

(56) References Cited

U.S. PATENT DOCUMENTS

| | | | |
|---|---|---|---|
| 5,806,068 A * | 9/1998 | Shaw et al. | 1/1 |
| 6,016,394 A * | 1/2000 | Walker | 717/104 |
| 6,097,887 A * | 8/2000 | Hardikar et al. | 717/105 |
| 6,233,590 B1 * | 5/2001 | Shaw et al. | 715/201 |
| 6,349,297 B1 * | 2/2002 | Shaw et al. | 1/1 |
| 6,424,989 B1 * | 7/2002 | Shaw et al. | 709/201 |
| 7,735,080 B2 | 6/2010 | Barturen et al. | |
| 2003/0009740 A1 | 1/2003 | Lan | |
| 2003/0233631 A1 * | 12/2003 | Curry et al. | 717/100 |
| 2005/0066304 A1 * | 3/2005 | Tattrie et al. | 717/101 |
| 2005/0114829 A1 * | 5/2005 | Robin et al. | 717/101 |
| 2005/0160103 A1 * | 7/2005 | Raffo | 707/100 |
| 2007/0234274 A1 * | 10/2007 | Ross et al. | 717/101 |

(Continued)

OTHER PUBLICATIONS

Munassar et al., "A Comparison Between Five Models of Software Engineering", IJCSI International Journal of Computer Science Issues, vol. 7, Issue 5, Sep. 2010, ISSN (Online): 1694-0814, pp. 94-101.

*Primary Examiner* — Chameli Das
(74) *Attorney, Agent, or Firm* — Bell & Manning, LLC

(57) ABSTRACT

Systems and methods are provided for automated generation of a customized software product. A system includes a computer-readable medium encoded with a project parameters data structure, where the project parameters data structure includes a plurality of project requirement records, and a project prototype. One or more data processors are configured to process a plurality of initial characteristics for the customized software product, populate the project parameters data structure at least based on the initial characteristics, and generate the project prototype based on the project parameters data structure. The one or more data processors are further configured to output a requirements matrix data structure at least based on the project parameters data structure and the project prototype and to generate the customized software product at least based on the requirements matrix data structure and the project prototype.

29 Claims, 15 Drawing Sheets

(56) References Cited

U.S. PATENT DOCUMENTS

| | | | |
|---|---|---|---|
| 2009/0113385 A1 | 4/2009 | Appleyard et al. | |
| 2009/0288061 A1* | 11/2009 | Silvera et al. | 717/101 |
| 2010/0275189 A1* | 10/2010 | Cooke et al. | 717/146 |
| 2010/0325121 A1* | 12/2010 | Martin | 707/759 |
| 2011/0016448 A1* | 1/2011 | Bauder et al. | 717/104 |
| 2011/0276939 A1* | 11/2011 | Frankin et al. | 717/101 |
| 2012/0198414 A1* | 8/2012 | Chen et al. | 717/102 |
| 2014/0026113 A1* | 1/2014 | Farooqi | 717/107 |

* cited by examiner

Ideal_Delivery_Approach.mpp

| ID | O | Task Name | Predecessors | Resource Names |
|---|---|---|---|---|
| 1 | | Project X - Ideal Delivery Approach | | |
| 2 | | Project Initialization | | |
| 3 | | Project Kickoff | | SAS Team |
| 4 | | High Level Requirements Gathering | 3 | AL,TL,PM |
| 5 | | Identify Customer Data Sources to Analyze | 4 | SAS Team |
| 6 | | Agree to Data Transfer Properties | 5 | TL,AL |
| 7 | | Software Install | 3 | |
| 8 | | Dev Installation & Configuration | | SSOIT,SSO Admin |
| 9 | | Test Installation & Configuration | 8 | SSOIT,SSO Admin |
| 10 | | Prod Installation & Configuration | 9 | SSOIT,SSO Admin |
| 11 | | Requirements and Discovery | | |
| 12 | | Phase 1 | | |
| 13 | | Receive Data | 6,8 | Customer |
| 14 | | Extract Data | 13 | ETL 1 |
| 15 | | Validate Extracts | 14 | ETL 1 |
| 16 | | Data Quality Checks | 15 | Analyst1 |
| 17 | | Iterative Analysis | | |
| 18 | | Iteration 1 | | |
| 19 | | Exploratory Data Analysis | 16 | Analysts |
| 20 | | Review Results with Customer | 19 | Analysts,TL |
| 21 | | Iteration 2 | | |
| 22 | | Continued Data Analysis | 20 | Analysts |
| 23 | | Prototype Development | 22SS+5 Days | Analysts |
| 24 | | Review Results with Customer | 23 | Analysts,TL |
| 25 | | Iteration 3 | | |
| 26 | | Continued Data Analysis | 24 | Analysts |
| 27 | | Continued Prototype Development | 26 | Analysts |
| 28 | | Review Results with Customer | 27 | Analysts,TL |
| 29 | | Deliver Requirements Doc/Matrix | 28 | SAS Team |
| 30 | | Phase 2 | | |

FIG. 6A

| ID | O | Task Name | Predecessors | Resource Names |
|---|---|---|---|---|
| 31 | | Receive Data | 12 | Customer |
| 32 | | Extract Data | 31 | ETL1 |
| 33 | | Validate Extracts | 32 | ETL1 |
| 34 | | Data Quality Checks | 33 | Analyst 1 |
| 35 | | Iterative Analysis | | |
| 36 | | Iteration 1 | | |
| 37 | | Exploratory Data Analysis | 34 | Analysts |
| 38 | | Review Results with Customer | 37 | Analysts, TL |
| 39 | | Iteration 2 | | |
| 40 | ● | Continued Data Analysis | 38 | Analysts |
| 41 | ● | Prototype Development | 40SS+5 Days | Analysts |
| 42 | ● | Review Results with Customer | 41 | Analysts, TL |
| 43 | | Iteration 3 | | |
| 44 | | Continued Data Analysis | 42 | Analysts |
| 45 | | Continued Prototype Development | 44 | Analysts, TL |
| 46 | ● | Review Results with Customer | 45 | Analysts, TL |
| 47 | | Deliver Requirements Doc/Matrix | 46 | SAS Team |
| 48 | | Phase 3 | | |
| 49 | | Receive Data | 30 | Customer |
| 50 | | Extract Data | 49 | ETL1 |
| 51 | | Validate Extracts | 50 | ETL1 |
| 52 | | Data Quality Checks | 51 | Analyst 1 |
| 53 | | Iterative Analysis | | |
| 54 | | Iteration 1 | | |
| 55 | | Exploratory Data Analysis | 52 | Analysts |
| 56 | | Review Results with Customer | 55 | Analysts, TL |
| 57 | | Iteration 2 | | |
| 58 | ● | Continued Data Analysis | 56 | Analysts |
| 59 | ● | Prototype Development | 58SS+5 Days | Analysts |
| 60 | ● | Review Results with Customer | 59 | Analysts, TL |

Ideal_Delivery_Approach.mpp

| ID | O | Task Name | Predecessors | Resource Names |
|---|---|---|---|---|
| 61 | | Iteration 3 | | |
| 62 | | Continued Data Analysis | 60 | Analysts |
| 63 | | Continued Prototype Development | 62 | Analysts |
| 64 | ◆ | Review Results with Customer | 63 | Analysts,TL |
| 65 | | Deliver Requirements Doc/Matrix | 64 | SAS Team |
| 66 | | Production Design and Build | | |
| 67 | | Phase 1 | | |
| 68 | | Prototype Handoff | 12 | SAS Team |
| 69 | | Design Production Build | 68 | |
| 70 | | Design Collection Data Mart | 70 | TL,Dev1 |
| 71 | ◆ | Design Alert Generation Processing | 70 | TL,Dev1 |
| 72 | ◆ | Design User Interface | 71 | TL,Dev1 |
| 73 | ◆ | Design Alert Workflow/Lifecycle | 72 | TL,Dev1 |
| 74 | | Finalize Design Doc | 73 | DOC Team |
| 75 | | Deliver Design Document | | SAS Team |
| 76 | ◆ | Develop Collection Data Mart Processing | 69SS+10 Days | Dev1 |
| 77 | | Productionalize Alert Generation Process | 76 | Dev1 |
| 78 | | Develop UI Data Mart | 77 | Dev1 |
| 79 | | Productionalize Interface | 77 | Dev2 |
| 80 | | Unit Test ETL/Incremental Loads | 76SS+10 Days | Dev2 |
| 81 | | Unit Test User Interface | 79 | Dev2 |
| 82 | | QA | 79 | QA1 |
| 83 | ◆ | QA Fixes | 82SS+2 Days | TL |
| 84 | | Promote to Testing Environment | 83 | SAS Admin,TL |
| 85 | | UAT | 84 | SAS Team |
| 86 | ◆ | Promote to Production Environment | 85 | SAS Admin,TL |
| 87 | | Phase 2 | | |
| 88 | | Prototype Handoff | 30 | SAS Team |
| 89 | | Design Production Build | 88 | |
| 90 | | Design Collection Data Mart | | TL,Dev1 |

Page 3

FIG. 6D

Ideal_Delivery_Approach.mpp

| ID | O | Task Name | Predecessors | Resource Names |
|---|---|---|---|---|
| 91 | | Design Alert Generation Processing | 90 | TL,Dev1 |
| 92 | ● | Design User Interface | 91 | TL,Dev1 |
| 93 | ● | Design Alert Workflow/Lifecycle | 91 | TL,Dev1 |
| 94 | ● | Finalize Design Doc | 92 | DOC Team |
| 95 | | Deliver Design Document | 93 | SAS Team |
| 96 | ● | Develop Collection Data Mart Processing | 89SS+10 Days | Dev1 |
| 97 | | Productionalize Alert Generation Process | 96 | Dev1 |
| 98 | | Develop UI Data Mart | 97 | Dev2 |
| 99 | | Productionalize Interface | 97 | Dev2 |
| 100 | | Unit Test ETL/Incremental Loads | 96SS+10 Days | Dev2 |
| 101 | | Unit Test User Interface | 99 | Dev2 |
| 102 | | QA | 99 | QA1 |
| 103 | ● | QA Fixes | 102SS+2 Days | TL |
| 104 | ● | Promote to Testing Environment | 103 | SAS Admin,TL |
| 105 | | UAT | 104 | SAS Team |
| 106 | | Promote to Production Environment | 105 | SAS Admin,TL |
| 107 | | Phase 3 | | |
| 108 | | Prototype Handoff | 48 | SAS Team |
| 109 | | Design Production Build | 108 | |
| 110 | | Design Collection Data Mart | 110 | TL,Dev1 |
| 111 | | Design Alert Generation Processing | 110 | TL,Dev1 |
| 112 | ● | Design User Interface | 111 | TL,Dev1 |
| 113 | ● | Design Alert Workflow/Lifecycle | 112 | TL,Dev1 |
| 114 | | Finalize Design Doc | 113 | DOC Team |
| 115 | | Deliver Design Document | | SAS Team |
| 116 | ● | Develop Collection Data Mart Processing | 109SS+10 Days | Dev1 |
| 117 | | Productionalize Alert Generation Process | 116 | Dev1 |
| 118 | | Develop UI Data Mart | 117 | Dev1 |
| 119 | | Productionalize Interface | 117 | Dev2 |
| 120 | | Unit Test ETL/Incremental Loads | 116SS+10 Days | Dev2 |

Ideal_Delivery_Approach.mpp

| ID | O | Task Name | Predecessors | Resource Names |
|---|---|---|---|---|
| 121 | | Unit Test User Interface | 119 | Dev2 |
| 122 | | QA | 119 | QA1 |
| 123 | | QA Fixes | 122SS+2 Days | TL |
| 124 | | Promote to Testing Environment | 123 | SAS Admin, TL |
| 125 | | UAT | 124 | SAS Team |
| 126 | | Promote to Production Environment | 125 | SAS Admin, TL |
| 127 | | Project Closeout | 107 | SAS Team |

FIG. 6E

Requirements Matrix

| Req ID | Source | Source Section ID | Project Areas Involved | Requirements Type | Requirement Statement | Comments Questions | Delivery Phase (1,2,3) | Priority | Measurable | Approval Date |
|---|---|---|---|---|---|---|---|---|---|---|
| 1.0 | | | | | | | | | | |
| 1.1 | | | | | | | | | | |
| 1.2 | | | | | | | | | | |
| 1.3 | | | | | | | | | | |
| 1.4 | | | | | | | | | | |
| 1.5 | | | | | | | | | | |
| 1.6 | | | | | | | | | | |
| 1.7 | | | | | | | | | | |
| 1.8 | | | | | | | | | | |
| 1.9 | | | | | | | | | | |
| 1.10 | | | | | | | | | | |
| 1.11 | | | | | | | | | | |
| 1.12 | | | | | | | | | | |
| 1.13 | | | | | | | | | | |
| 2.0 | | | | | | | | | | |
| 2.1 | | | | | | | | | | |
| 2.2 | | | | | | | | | | |
| 2.3 | | | | | | | | | | |
| 2.4 | | | | | | | | | | |
| 2.5 | | | | | | | | | | |
| 2.6 | | | | | | | | | | |
| 2.7 | | | | | | | | | | |
| 2.8 | | | | | | | | | | |
| 2.9 | | | | | | | | | | |
| 2.10 | | | | | | | | | | |
| 2.11 | | | | | | | | | | |
| 2.12 | | | | | | | | | | |
| 2.13 | | | | | | | | | | |
| 3.0 | | | | | | | | | | |
| 3.1 | | | | | | | | | | |
| 3.2 | | | | | | | | | | |
| 3.3 | | | | | | | | | | |
| 3.4 | | | | | | | | | | |
| 3.5 | | | | | | | | | | |
| 3.6 | | | | | | | | | | |
| 3.7 | | | | | | | | | | |
| 3.8 | | | | | | | | | | |
| 3.9 | | | | | | | | | | |
| 3.10 | | | | | | | | | | |
| 3.11 | | | | | | | | | | |
| 3.12 | | | | | | | | | | |
| 3.13 | | | | | | | | | | |

FIG. 7

COMPUTER-IMPLEMENTED SYSTEMS AND METHODS FOR AUTOMATED GENERATION OF A CUSTOMIZED SOFTWARE PRODUCT

CROSS REFERENCE TO RELATED APPLICATIONS

This application claims priority to U.S. Provisional Patent Application No. 61/737,908, filed on Dec. 17, 2012, the entirety of which is herein incorporated by reference.

TECHNICAL FIELD

This document relates generally to computer-implemented software generation and more particularly to customized software project management.

BACKGROUND

Software development paradigms tend to involve the transition from a defined set of project requirements to a formal software component, preferably in the shortest time possible while producing a quality product. Service delivery products tended to be structured to support implementation of a known solution with less focus on analytic results (e.g., a waterfall design and delivery approach).

SUMMARY

In accordance with the teachings herein, systems and methods are provided for automated generation of a customized software product. In one example, a system includes a computer-readable medium encoded with a project parameters data structure, where the project parameters data structure includes a plurality of project requirement records, and a project prototype. One or more data processors are configured to process a plurality of initial characteristics for the customized software product, populate the project parameters data structure at least based on the initial characteristics, and generate the project prototype based on the project parameters data structure. The one or more data processors are further configured to output a requirements matrix data structure at least based on the project parameters data structure and the project prototype and to generate the customized software product at least based on the requirements matrix data structure and the project prototype.

In another example, a computer-readable medium for automated generation of a customized software product is encoded with a project parameters data structure, where the project parameters data structure includes a plurality of project requirement records, and a project prototype. The computer-readable medium is further encoded with instructions for commanding one or more data processors to process a plurality of initial characteristics for the customized software product, populate the project parameters data structure at least based on the initial characteristics, and generate the project prototype based on the project parameters data structure. The instructions further command the one or more data processors to output a requirements matrix data structure at least based on the project parameters data structure and the project prototype and to generate the customized software product at least based on the requirements matrix data structure and the project prototype.

As a further example, a method for automated generation of a customized software product includes generating a customized processing a plurality of initial characteristics for a customized software product, populating a project parameters data structure at least based on the initial characteristics, where the project parameters data structure includes a plurality of project requirement records, and where one or more of the project requirement records includes one or more fields identifying a characteristic of the customized software product, and generating a project prototype based on the project parameters data structure. The method further includes outputting a requirements matrix data structure at least based on the project parameters data structure and the project prototype and generating the customized software product at least based on the requirements matrix data structure and the project prototype.

As additional examples, in a system, the one or more data processors may be further configured to iteratively receive additional characteristics for the customized software product and update the project parameters data structure and the project prototype at least based on the iteratively received characteristics, where the customized software product is updated at least based on the updated project parameters data structure and the updated project prototype. The one or more data processors may be further configured to determine an estimate of value of the customized software product at least based on the project parameters data structure and output the estimate of value with the requirements matrix data structure. One of the initial characteristics may comprise a data source characteristic. A record of the project parameters data structure may be populated with at least a data source name, a data source location, a data source string, and a data field stored at the data source. The one or more data processors may be further configured to generate the customized software product in parallel with iterative receiving of additional characteristics. Prior to processing the initial characteristics, the system may be configured to receive the initial characteristics. The one or more data processors may be configured to receive additional or updated characteristics are prior to the outputting of the requirements matrix, where the project parameters data structure is updated at least based on the additional or updated characteristics. Multiple additional or updated characteristics may be received multiple times prior to outputting the requirements matrix. The project prototype may be a software product, and the project prototype may comprise a mathematical function, an algorithm, or a set of logic rules.

BRIEF DESCRIPTION OF THE FIGURES

FIGS. 6A-6E show examples of a project timeline for an ideal delivery approach using the analytic delivery model.

FIG. 7 is a diagram depicting an example of a format for a requirements matrix data structure.

DETAILED DESCRIPTION

While certain methodologies facilitate and encourage some degree of flexibility, some implementations of the systems described herein provide a structured system framework that facilitates iterative development of requirements for an analytic solution and the analytic solution itself when the parameters of the desired analytic solution are initially less defined.

Figure 1:
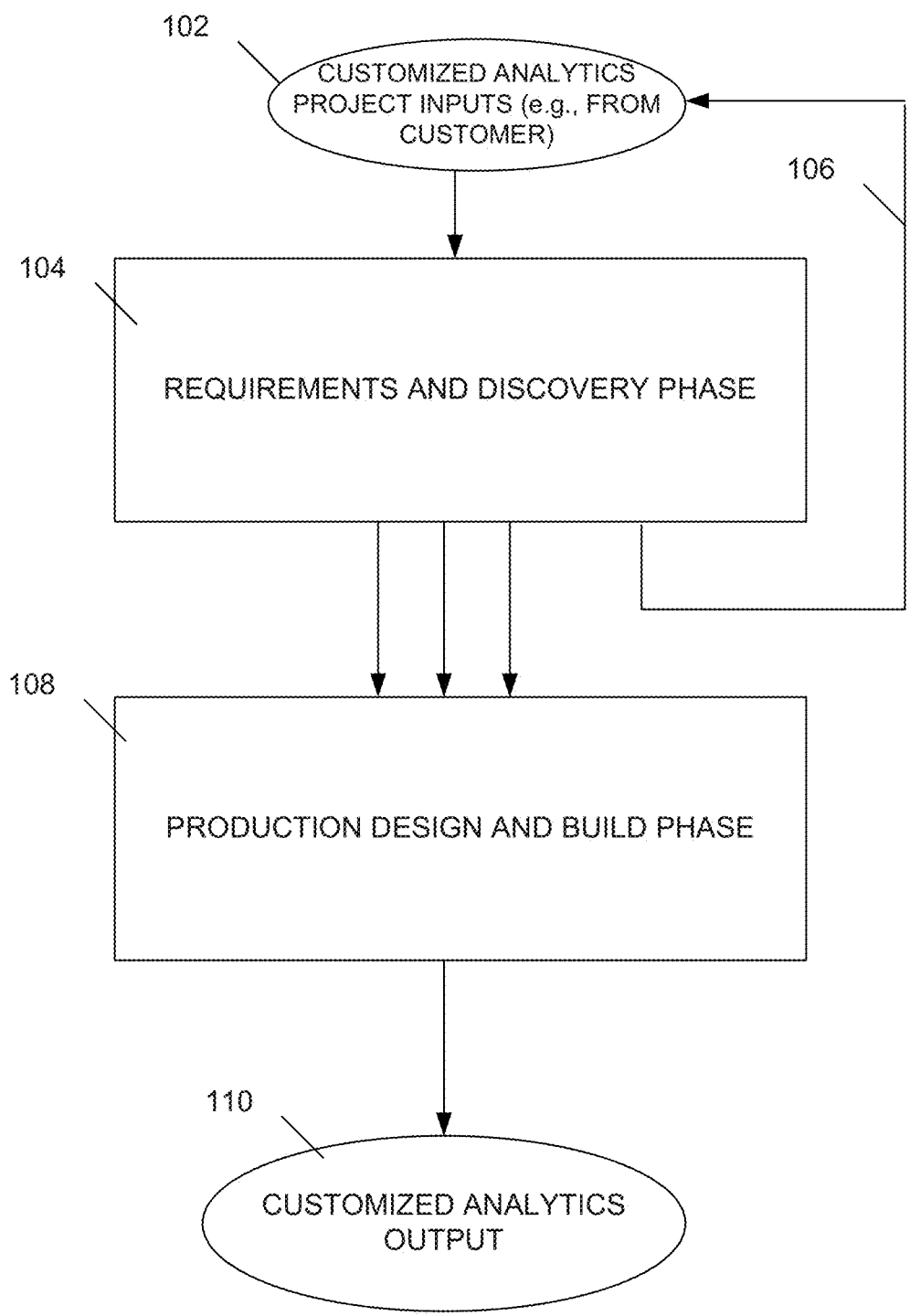
FIG. 1 is a flow diagram depicting an example of a process flow of an analytic delivery model.

FIG. 1 is a flow diagram depicting an example of a process flow of an analytic delivery model. The analytic delivery model provides a framework for producing an analytic solution, such as a formal, functioning software product, according to an analytic delivery model. An analytic delivery model may be designed to focus on driving rapid value to customers as quickly as possible for analytics focused products. An analytic delivery model may obviate the need for a waterfall delivery approach or at least expands on such an approach in providing an iterative process designed to deliver analytic results based on ongoing input and validation of a customer.

The analytic delivery model may be an iterative approach that includes multiple consultations with a customer to develop the requirements and expectations for a customized analytics project. Some systems utilize a more straight-line approach, where requirements are dictated at the beginning of the project and are then implemented in software. The analytic delivery model receives an initial set of customized analytic project inputs 102 and performs an iterative requirements and discovery phase (stream) 104 to develop and refine the requirements and expectations for the project. The requirements and discovery stream 104 develops certain outputs, such as a requirements matrix and a project prototype, and updates to those outputs that evidence the progress of the requirements and discovery phase 104. Multiple iterations of interactions with a customer and execution of the requirements and discovery phase 104 may be performed to further refine the outputs of the requirements and discovery phase 104. After a certain number of iterations, or when the requirements and discovery phase 104 outputs are sufficiently refined, a production design and build phase 108 is performed. The production design and build phase 108 receives the outputs of the requirements and discovery phase 104, such as a requirements matrix and a project prototype, and uses those outputs to generate a customized analytics output 110, such as a customized software program. The production design and build phase 108 may be executed in parallel with subsequent iterations of the requirements and discovery phase 104. Such an arrangement enables further refinement of certain analytics that form the basis of the customized analytics output 110 while allowing production design and building of the customized analytics output 110 to begin. Such an arrangement can provide a customized analytics output 110 having the highest quality analytics, refined over the life cycle of the customized analytics output 110 development, in a sufficiently efficient time period.

In addition to efficient development of a quality customized analytics output 110, a customized software product generation system can provide a customer with a general return on investment (ROI) (based on the customer's definition of value) or other value estimate early in a project. In some implementations, because an analytic projects' return or value often hinge on an ability to leverage available data to analyze for results, an estimate project value may not be produced prior to production cycles of data analysis. In certain implementations, an analytic delivery model can be focused on more than maximizing results and can additionally provide an estimate of value or return early in a project based on requirements and discovery phase developments as opposed to only being able to provide such an output after a full production deployment.

Additionally, an analytic delivery model can facilitate iterative development of a prototype with the customer that facilitates customer expectations throughout development. Such interaction can better align the requirements of a project with the customer's definition of value. Requirements can be captured and formalized iteratively throughout the process as learnings from initial analytic iterations are discussed and confirmed with the customer.

An analytic delivery model can avoid expensive development of a large data warehouse across disparate data sources if the prototype and eventual deliverable only actually leverage a small set of data. The development of the prototype can also offer savings. The prototype is developed and updated as analytical results are confirmed and discussed with the customer. The prototype can take a variety of forms including a software prototype, a mathematical function, an algorithm, or a set of logic rules. The prototype is leveraged as an artifact during the production design and build phase 108, where it can be utilized as a guide to reduce overall design and delivery time. An analytic delivery model can streamline projects by enabling teams to work in parallel for multi-phase projects. Analysts can focus on mining data to solve problems (e.g., develop the analytic basis for the customized output 110) while technical resources can leverage the prototype and requirements produced by the analysts to perform formal design and deployment.

An analytic delivery model can be visualized as multiple separate work streams. The requirements and discovery work stream may be focused on showing maximum value from analytics. The production design and build work stream may be dedicated to taking inputs from the requirements and discovery work stream and leveraging those inputs to design and develop the final production deliverable.

Figure 2:
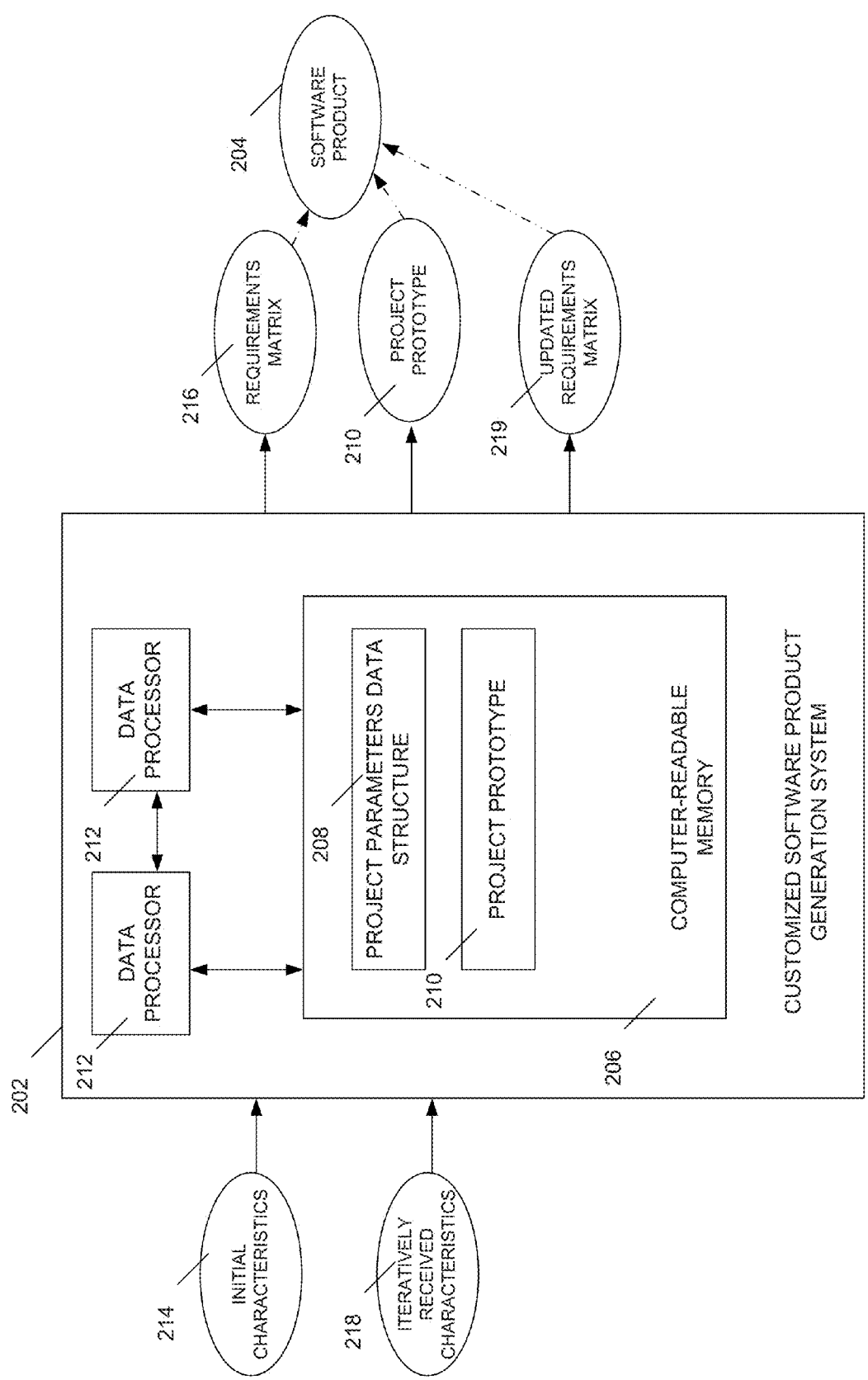
FIG. 2 is a block diagram depicting an example of a computer-implemented customized software product generation system.

FIG. 2 is a block diagram depicting an example of a computer-implemented customized software product generation system. A customized software product generation system 202 is provided for automated generation of a customized software product 204. The system 202 includes one or more computer-readable memories 206. A computer-readable memory 206 is encoded with information that includes a project parameters data structure 208. The project parameters data structure includes a plurality of project requirement records. One or more of the project requirement records includes one or more fields identifying a characteristic of the customized software product. A computer-readable memory 206 also includes a project prototype 210. The project prototype 210 may take a variety of forms including a software prototype, a mathematical function, an algorithm, or a set of logic rules.

The system 202 further includes one or more data processors 212. In one example, a data processor 212 is configured to process a plurality of initial characteristics 214 for the customized software product 204. The data processor 212 populates the project parameters data structure 208 at least based on the received initial characteristics. The project prototype 210 is generated based on the project parameters data structure 208. A requirements matrix data structure 216 is outputted at least based on the project parameters data structure 208 and the project prototype 210. The customized software product 204 is generated at least based on the requirements matrix data structure 216 and the project prototype 210.

In one example, additional characteristics 218 for the customized software product 204 are iteratively received. The data processor 212 is configured to update the project parameters data structure 208 and the project prototype 210 at least based on the iteratively received characteristics 218. The updated project prototype 210 and requirements matrix 219 developed during the subsequent iteration of the requirements and discovery phrase are then provided to the production design and build phase for updating of the customized software product 204.

Figure 3:
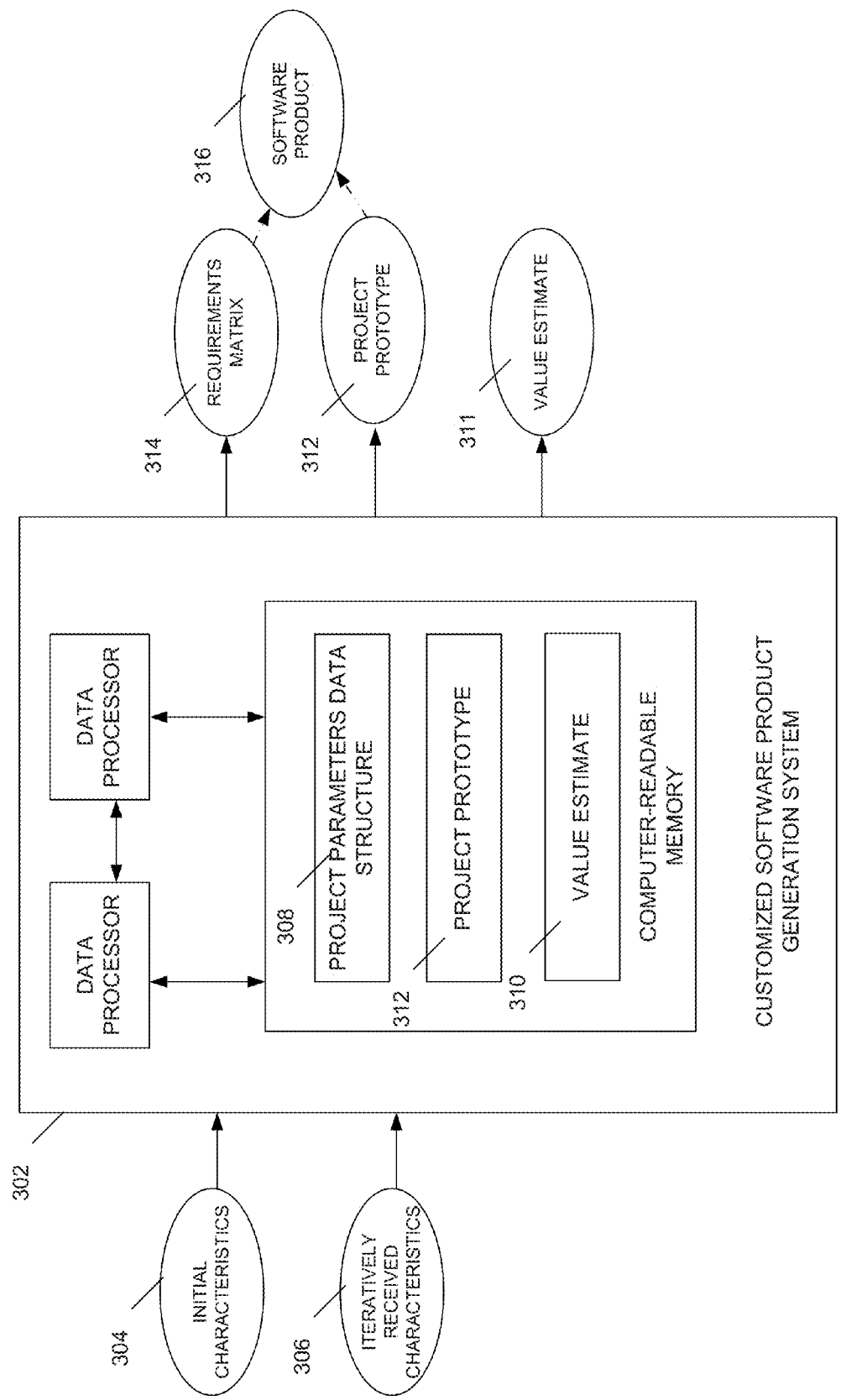
FIG. 3 is a block diagram depicting another example of a customized software product generation system.

FIG. 3 is a block diagram depicting another example of a customized software product generation system. The system of FIG. 3 facilitates the parallelization of the requirements and discovery stream and the production design and build stream. The system 302 of FIG. 3 manages certain data inputs 304, 306, internal data structures 308, 310, and project prototypes 312 of the requirements and discovery stream. The requirements and discovery stream seeks to generate a requirements matrix 314 and the project prototype 312, which are output by the customized software product generation system 302 for use by the production design and build stream while subsequent iterations of the requirements and discovery stream are performed. The project prototype 312 and the requirements matrix 314 can be used by the production design and build stream to generate the customized output, such as customized software product 316. In addition to the outputs 312, 314 utilized by the production design and build stream, the customized software product generation system 302 further outputs a value estimate 311 based on the current state of the analytics developed during the current iteration of the requirements and discovery stream.

A number of tasks may be performed during the requirements and discovery phase. Analysts may perform exploratory data analysis (EDA) and hold question and answer sessions with the customer. This enables the analytical team to understand customer objectives and expectations. Once the objectives and expectations are clear, the question and answer sessions can help the analytical team to understand what data is available to possibly assist the team in addressing the project objectives and expectations. Exploratory data analysis can then be performed on selected data to mine information or analytic results that could help address the objectives.

The analysts can then iterate through the results with the customer. Results and findings are shared and reviewed with the customer at regular intervals during the requirements and discovery phase. The review sessions can be useful in verifying the accuracy of the findings and ensuring that the general direction of the analysis is consistent with customer expectations. Feedback can be integrated into the next iteration of analysis and development of the prototype.

One result of the discussions during the requirements and discovery phase is the requirements matrix, which identifies a set of one or more requirements for the customized analytics output. Each iteration of the requirements and discovery phase could result in updates to requirements matrix, which can formalize the understanding between the analysts and customer.

Upon sufficient iterations of the requirements and discovery phase, a prototype can be developed. The prototype may be based on validated analytical results and feedback from the review sessions with the customer. The prototype may be designed to enable customers and eventual system end users to visualize and utilize analytical results. The prototype can be used to simulate the eventual deliverable.

Throughout the development of the analytic basis for the deliverable and prototype, the expected value for the project can be estimated based on the status of the intermediate results. The expected value can take a variety of forms such as: the amount of dollars in fraud expected to be detected; the uplift in dollars that a risk model is expected to provide to mortgage lenders; or the accuracy of the analytics to predict events. The ability to monitor value throughout the process can be valuable in making business decisions, such as whether to discontinue the project (e.g., when the expected value is low) or whether to devote more resources to the project (e.g., when the expected value is high). The quality of the intermediate analytics and prototype can be periodically reviewed to estimate the value estimate 311, which is provided as an output of the customized software product generation system 302 for review and use in decision making.

Analysts may iterate through these steps three or more times, for example, using the customized software product generation system during the requirements and discovery phase. Once the expected results are achieved or a predetermined number of iterations have occurred, the prototype, requirements matrix, and any other leveragable artifacts from the requirements and discovery work stream are passed to team members responsible for the production design and build work stream.

The production design and build work stream can be focused on taking inputs from the requirements and delivery work stream and leveraging those inputs to design and develop the final product deliverable. Using the requirements matrix, prototype, and any other artifacts from the requirements and delivery phase can provide clarity to the customer and project team as to the customer expectations of the final deliverable. The use of the requirements and delivery phase artifacts can accelerate the timeline of the production design and build phase.

A data source definition can be realized through the requirements and discovery phase that is carefully considered and narrowly tailored to the analytics being developed. Creating and maintaining a large data store that tracks many fields for a large number of records can be very time consuming and expensive. Sometimes through the course of development or use of an analytical solution made using some methods, it is discovered that some of the data stored is not necessary or helpful in performing the analytics. For example, a data store may track a number of attributes that are eventually deemed not significant to the analytics being performed. Despite the non-use or limited use of those attributes in the final product, these attributes may be still gathered and stored, where each of those activities can have associated time and monetary costs.

Figure 4:
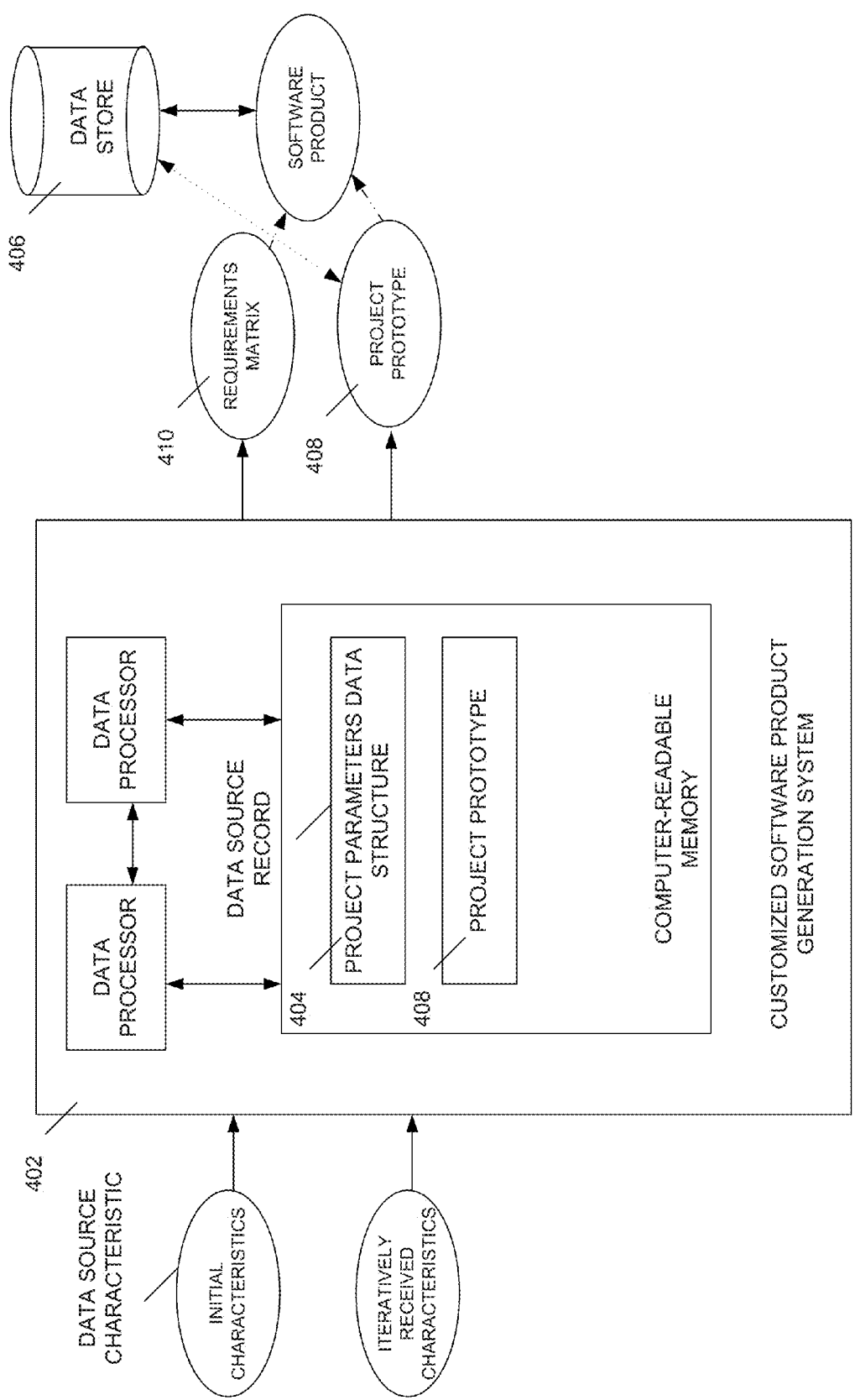
FIG. 4 is a block diagram depicting an example of a customized software product generation system that tracks data source information.

The customized software product generation system described herein can mitigate these costs. FIG. 4 is a block diagram depicting an example of a customized software product generation system that tracks data source information. Through iterations of the requirements and discovery phase, the analytics to be used in the final product can be developed and refined. Each cycle of the requirements and discovery phase may assist to better define the analytics and the inputs for those analytics. After a sufficient number of iterations, a set of desired data may be known. The customized software product generation system 402 can track details of that desired data in the project parameters data structure 404. Those details can include a data store name and address, a data store login and password, and data store data fields to be accessed. That desired data to populate the data store 406 can be collected in whole or limited form in parallel with development of the prototype.

Once the initial data to populate the data store 406 has been gathered and the prototype 408 has been developed, a round of testing can be performed in the requirements and discovery phase to determine whether the prototype 408 that is executing the analytics designed during the requirements and discovery phase is performing according to expectations. If the prototype 408 is not performing to expectations, additional iterations of the requirements and discovery phrase can be performed to tweak the analytics and the resulting prototype. Such adjustments could have an impact on the developed data store 406, such as modifying the data store 406 to store more or fewer fields, differing records, or other adjustments. Once the analyst and customer are comfortable that the prototype 408 and the associated analytics are performing as desired, the prototype 408 and the requirements matrix 410, which may include the definition data for the data store 406, are outputted for use in the production design and build phase. The data store 406 can then be generated or modified for use in a production environment, especially when a simplified (e.g., fewer records) representation of the data store 406 was utilized in testing the prototype 408.

In some implementations, additional iterations of the requirements and discovery phase may be performed in parallel with the production design and build phase to further refine the prototype 408, the requirements matrix 410, and any other artifacts provided for use in the production design and build phase. Those revised artifacts can be provided to those working in the production design and build phase as developed to further refine the final deliverable.

Figure 5A:
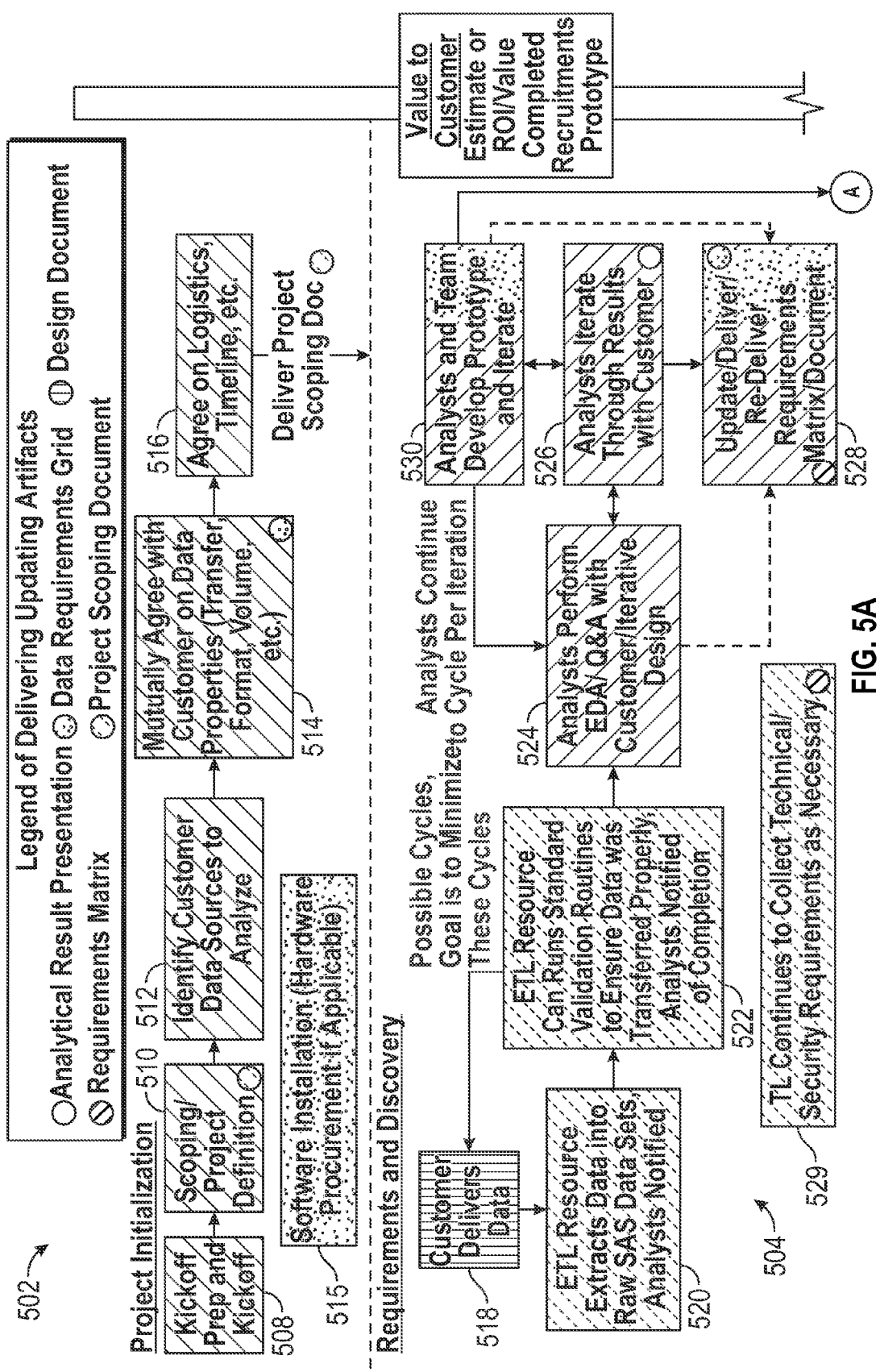
FIGS. 5A-5B are flow diagram depicting an example of a project flow using the analytic delivery model.
Figure 5B:
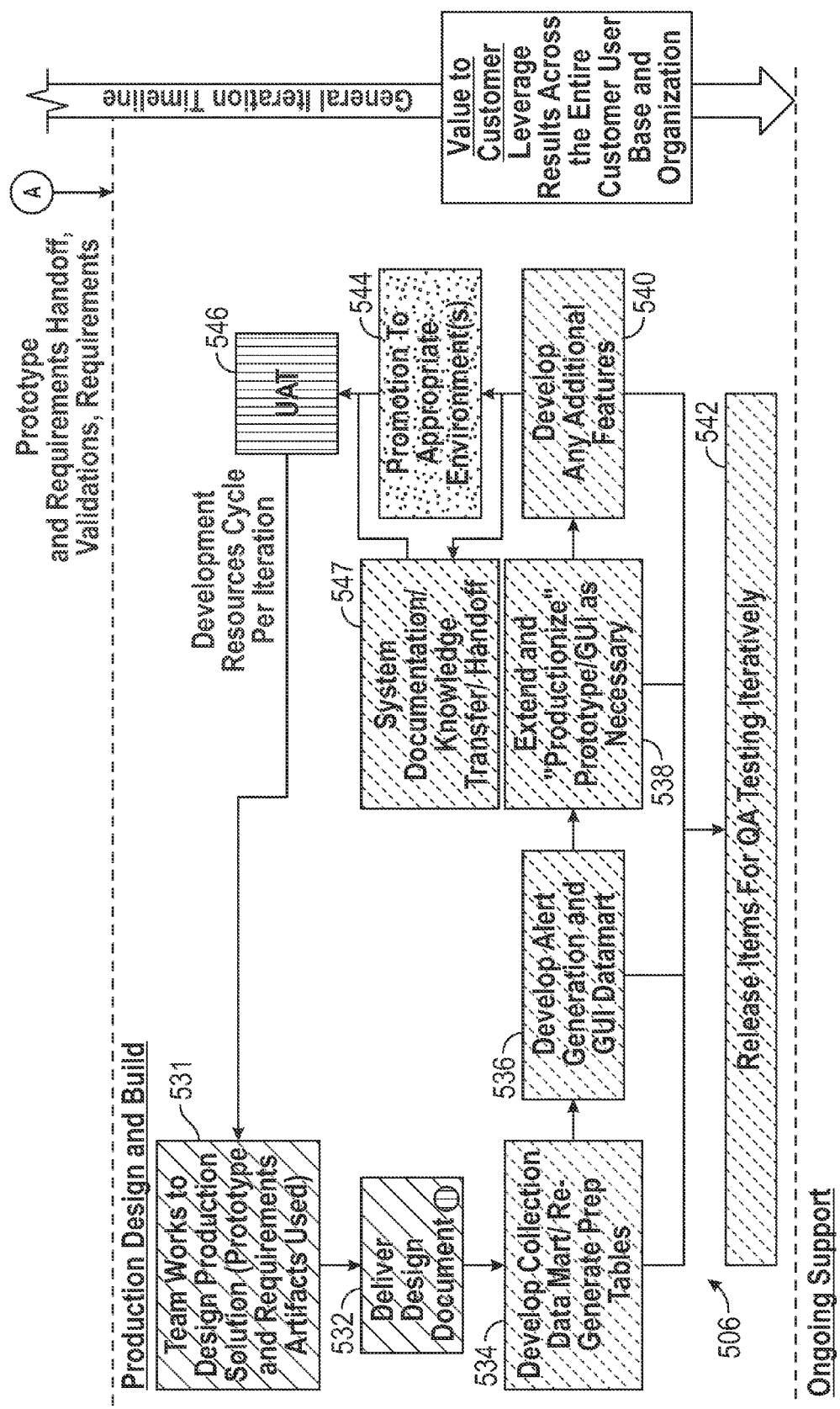

FIGS. 5A-5B are flow diagram depicting an example of a project flow using the analytic delivery model. A project initialization 502 is performed as a precursor to the requirements and discovery phase 504 and the production design and build phase 506. The project initialization includes initial kickoff meetings 508 to produce an initial scoping document at 510 that contains initial characteristics for the project. The project initialization 502 may identify certain potential data sources at 512 and work to reach a mutual agreement between the analyst and customer on data properties, such as transfer format, volume, and other characteristics at 514. These mutual agreements may be immortalized in a data requirements grid. Software may be installed as necessary at 515. Other initial discussions may occur at 516 including discussions regarding logistics and timelines. The project scoping document, any developed data requirements grid, and any other project initialization artifacts are then provided for use in the requirements and discovery phase 504.

The requirements and discovery phase 504 may include two sub-loops that may function independently. A first sub-loop is focused on creation of the data store. In that sub-loop, the customer delivers data at 518, and the data is extracted into raw data sets at 520. The data can be validated at 522 to ensure proper acquisition. These operations 518, 520, 522 may be repeated as necessary to meet the changing requirements of the analytics during iterations of the requirements and discovery phase 504.

The second sub-loop is focused on analytics development. An iteration of the second sub-loop can include question and answer sessions with the client or other discussions followed by a round of iterative design at 524. The results of the round of iterative design at 524 are discussed with the customer at 526. Based on these discussions at 526, the requirements matrix document may be updated at 528 and prototype development may be performed at 530. When the project has sufficiently matured through multiple iterations of the requirements and discovery phase, deliverables of that phase, such as the requirements matrix and prototype, are provided to the production design and build phase 506. The operations of the second sub-loop 524, 526, 528, 530 may be repeated in subsequent iterations of the requirements and discovery phase 504 as necessary. For example, the second sub-loop may be performed three or more times before an initial prototype is developed and that prototype and the requirements matrix are provided to the production design and build phase 506. The first and second sub-loops may continue to be iterated, even after initial deliverables are provided to the production design and build phase 506, to further refine those deliverables and improve the final overall deliverable. Throughout the requirements and discovery phase 504, analysts and technicians collect and develop technical and security requirements as necessary at 529.

The production design and build phase 506 may be an iterative stage that works to provide the final deliverable based on the artifacts received from the requirements and discovery phase 504 (e.g., the requirements matrix/document and project prototype). At 531, the team works to design a production solution using those artifacts to create a design document, which is delivered at 532. The data store is developed at 534 according to the design document based on the data store discovery work performed during the requirements and discovery phase 504. Alerts are developed at 536 and the prototype is productionized (e.g., expanded upon, re-coded) at 538, with any additional features being developed at 540. The developed deliverables may be provided iteratively for quality assurance testing 542. Once the deliverable is believed to be of sufficient quality, that deliverable can be promoted to an appropriate environment at 544 for user acceptance testing at 546. These production operations can be iterated through to develop the final deliverable, including based on additional data provided by subsequent iterations of the requirements and discovery phase 504. Throughout the production design and build phase 506, system documentation and revised, as indicated at 547.

FIGS. 6A-6E show examples of a project timeline for an ideal delivery approach using the analytic delivery model. The ideal delivery approach includes a project initialization shown in FIG. 6A, three iterations of the requirements and discovery phase shown in FIGS. 6A-6C, and three iterations of the design and build phase shown in FIGS. 6C-6E.

FIG. 7 is a diagram depicting an example of a format for a requirements matrix data structure. The requirements matrix includes fields for the source of the requirements and an identifier of such, the project area of the requirements, the type of requirements, a description of the requirements, notes regarding the requirements, a delivery target, a priority, whether the requirement is measurable, and an approval date for the requirements. The requirements data structure data may be stored as part of a project parameters data structure of a customized software generation system. Upon sufficient iterations of the requirements and discovery phase, a tangible form of the requirements matrix data structure may be provided to personnel designated to perform the production design and build phase.

Figure 8:
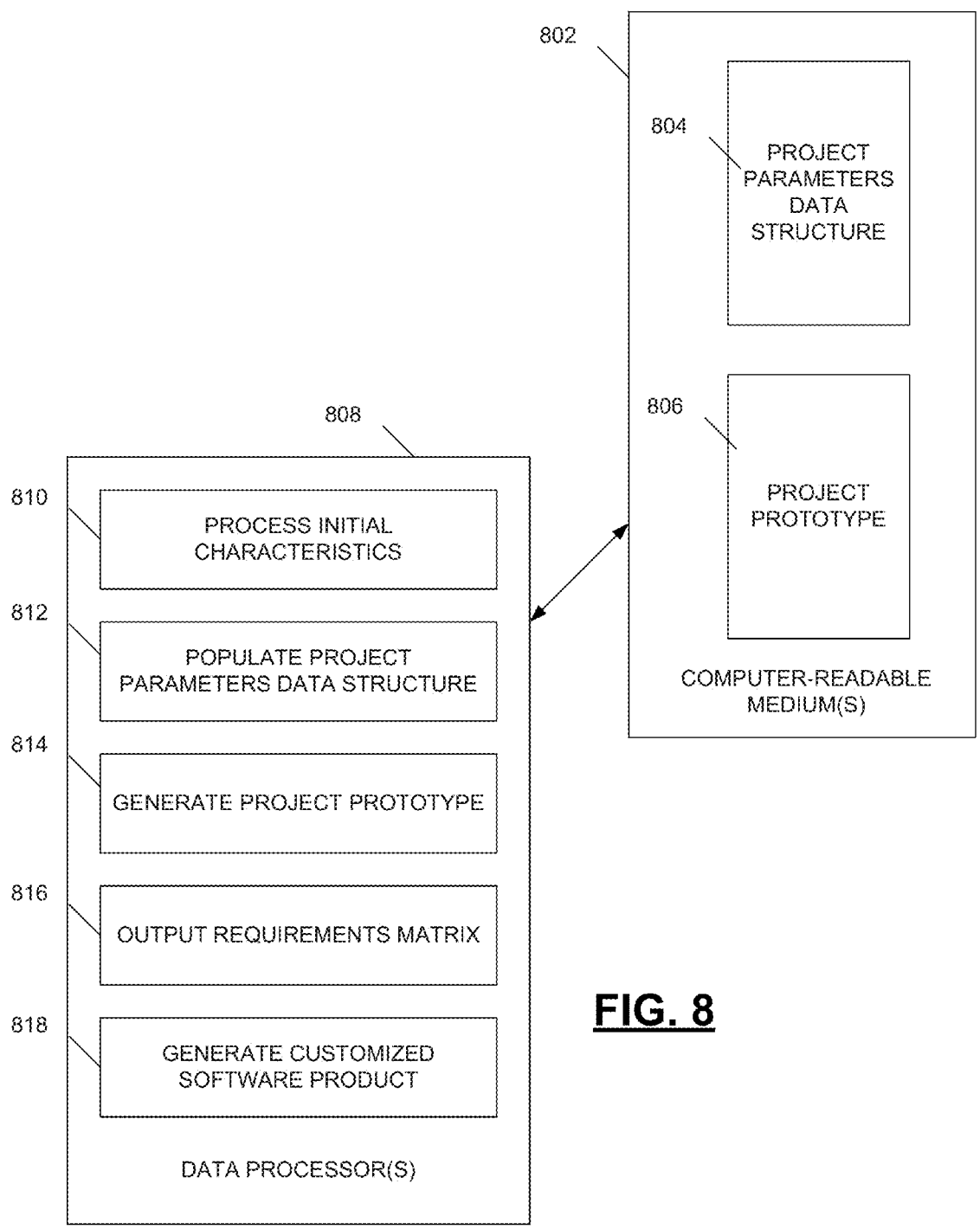
FIG. 8 is a block diagram depicting an example of a computer-implemented system for automated generation of a customized software product.

FIG. 8 is a block diagram depicting an example of a computer-implemented system for automated generation of a customized software product. One or more computer-readable mediums 802 are encoded with information that includes a project parameters data structure 804. The project parameters data structure includes a plurality of project requirement records, where one or more of the project requirement records includes one or more fields identifying a characteristic of the customized software product. The one or more computer-readable mediums 802 further include a project prototype 806. One or more data processors 808 are configured to process a plurality of initial characteristics for the customized software product at 810. At 812, the project parameters data structure is populated at least based on the received initial characteristics, and at 814, the project prototype is generated based on the project parameters data structure. A requirements matrix data structure is outputted at 816 based on the project parameters data structure and the project prototype, and at 818, the customized software product is generated at least based on the requirements matrix data structure and the project prototype.

Figure 9A:
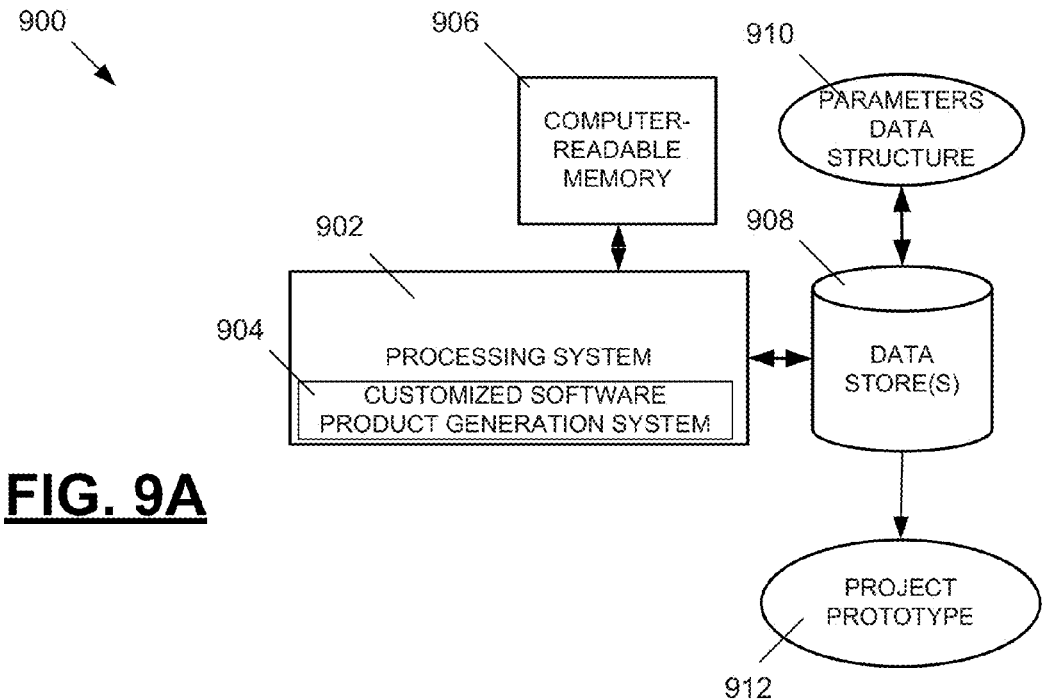
FIGS. 9A, 9B, and 9C depict example systems for use in implementing a customized software product generation system.
Figure 9B:
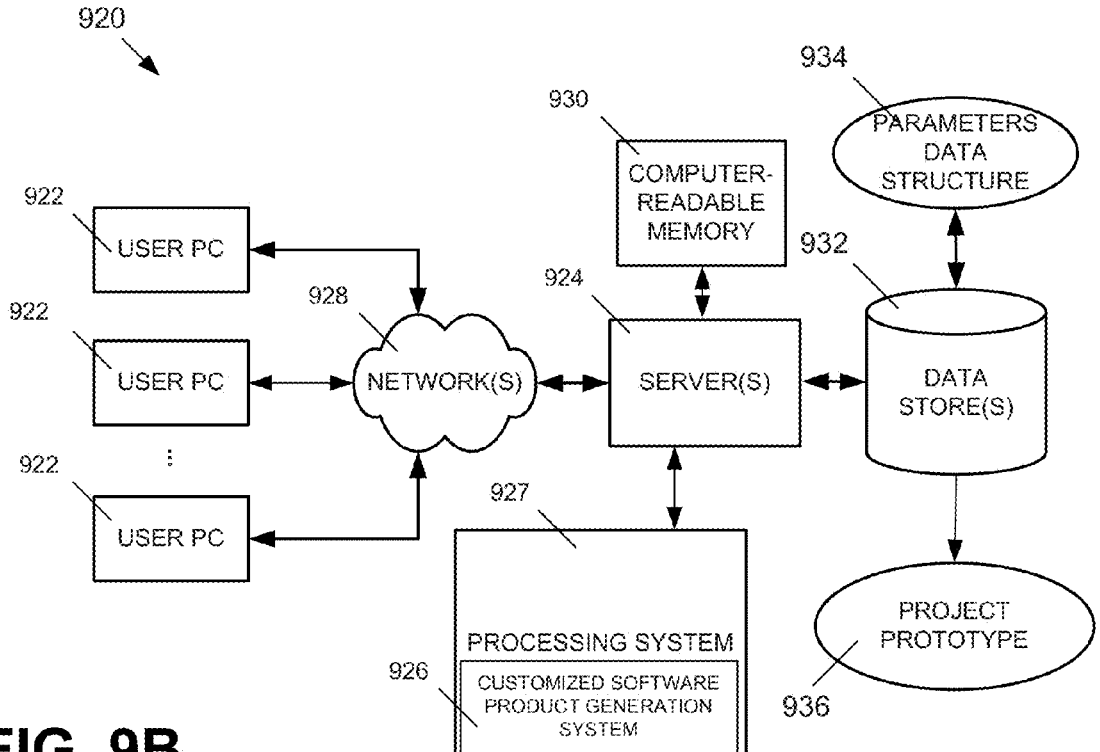
Figure 9C:
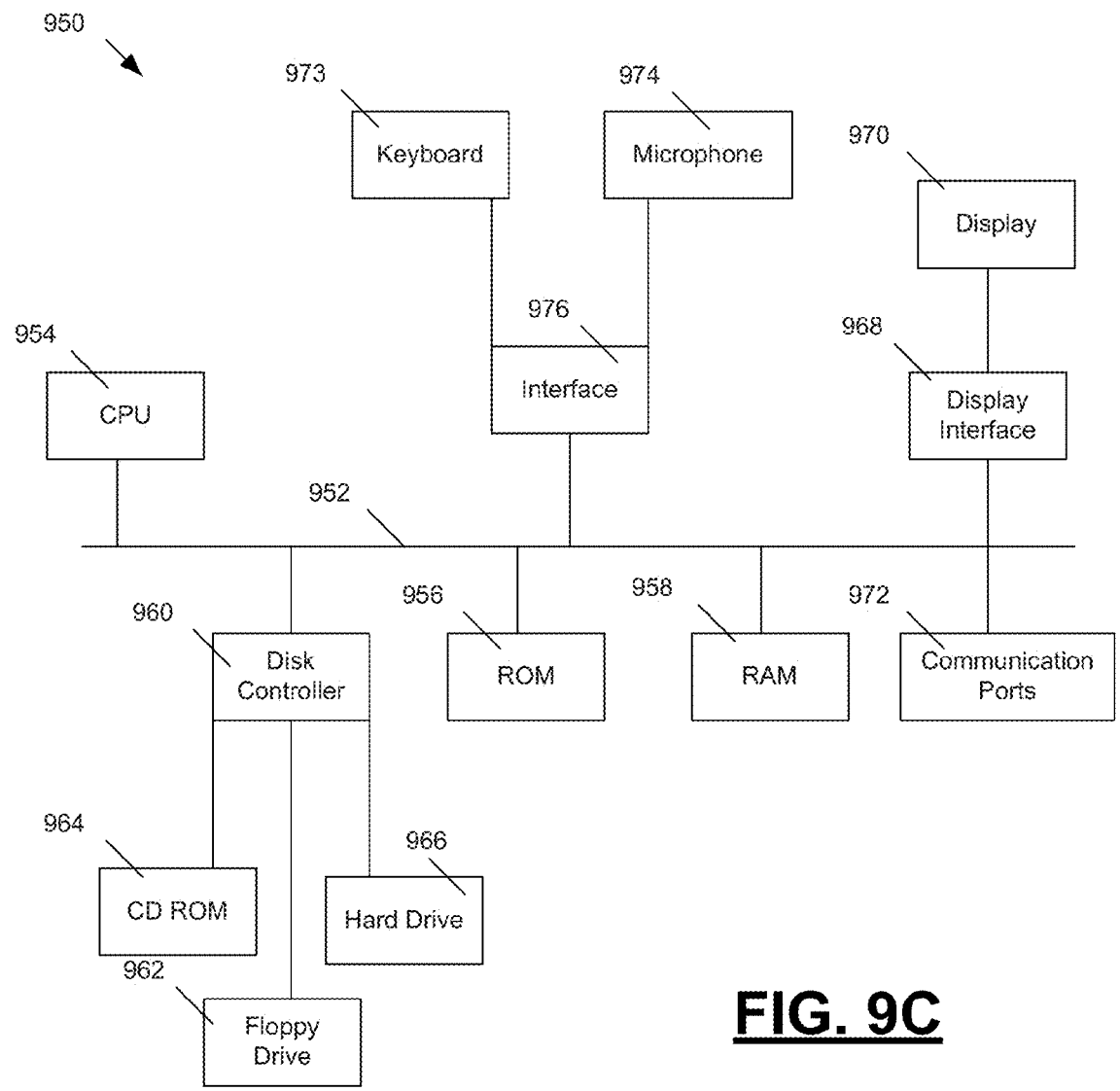

FIGS. 9A, 9B, and 9C depict example systems for use in implementing a customized software product generation system. For example, FIG. 9A depicts an exemplary system 900 that includes a standalone computer architecture where a processing system 902 (e.g., one or more computer processors) includes a customized software product generation system 904 being executed on it. The processing system 902 has access to a computer-readable memory 906 in addition to one or more data stores 908. The one or more data stores 908 may include a parameters data structure 910 as well as a project prototype 912.

FIG. 9B depicts a system 920 that includes a client server architecture. One or more user PCs 922 accesses one or more servers 924 running a customized software product generation system 926 on a processing system 927 via one or more networks 928. The one or more servers 924 may access a computer readable memory 930 as well as one or more data stores 932. The one or more data stores 932 may contain a parameters data structure 934 as well as a project prototype 936.

FIG. 9C shows a block diagram of exemplary hardware for a standalone computer architecture 950, such as the architecture depicted in FIG. 9A that may be used to contain and/or implement the program instructions of system embodiments of the present invention. A bus 952 may serve as the information highway interconnecting the other illustrated components of the hardware. A processing system 954 labeled CPU (central processing unit) (e.g., one or more computer processors), may perform calculations and logic operations required to execute a program. A processor-readable storage medium, such as read only memory (ROM) 956 and random access memory (RAM) 958, may be in communication with the processing system 954 and may contain one or more programming instructions for performing the method of implementing a customized software product generation system. Optionally, program instructions may be stored on a computer readable storage medium such as a magnetic disk, optical disk, recordable memory device, flash memory, or other physical storage medium.

A disk controller 960 interfaces one or more optional disk drives to the system bus 952. These disk drives may be external or internal floppy disk drives such as 962, external or internal CD-ROM, CD-R, CD-RW or DVD drives such as 964, or external or internal hard drives 966. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 960, the ROM 956 and/or the RAM 958. The processing system 954 may access each component as required.

A display interface 968 may permit information from the bus 952 to be displayed on a display 970 in audio, graphic, or alphanumeric format. Communication with external devices may optionally occur using various communication ports 972.

In addition to the standard computer-type components, the hardware may also include data input devices, such as a keyboard 973, or other input device 974, such as a microphone, remote control, pointer, mouse and/or joystick.

As additional examples, for example, the systems and methods may include data conveyed via networks (e.g., local area network, wide area network, internet, combinations thereof, etc.), fiber optic medium, carrier waves, wireless networks, etc. for communication with one or more data processing devices. Data transmissions can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented system for automated generation of a customized software product, comprising:
one or more non-transitory computer-readable storage mediums, wherein the one or more computer-readable storage mediums are encoded with information comprising:

a project parameters data structure, wherein the project parameters data structure includes a plurality of project requirement records, wherein one or more of the project requirement records includes one or more fields identifying a characteristic of the customized software product; and a project prototype; and one or more data processors configured to:

receive a plurality of initial characteristics for the customized software product, wherein the initial characteristics comprise a data source name and a data source location;

populate the project parameters data structure at least based on the received initial characteristics;

generate the project prototype by performing exploratory data analysis of data stored in the data source location with the data source name;

output a requirements matrix data structure at least based on the project parameters data structure and the project prototype;

generate the customized software product at least based on the output requirements matrix data structure and the generated project prototype;

receive a second plurality of initial characteristics for the customized software product, wherein the second initial characteristics comprise a second data source name and a second data source location;

update the project prototype by performing second exploratory data analysis of second data stored in the second data source location with the second data source name;

update the requirements matrix data structure at least based on the project parameters data structure and the updated project prototype; and update the customized software product at least based on the updated requirements matrix data structure and the updated project prototype, wherein the update of the project prototype and the update of the requirements matrix data structure occurs in parallel with the generation of the customized software product.

2. The system of claim 1, wherein the one or more data processors are further configured to:

determine an estimate of value of the customized software product at least based on the project parameters data structure; and output the estimate of value with the requirements matrix data structure.

3. The system of claim 1, wherein a record of the project parameters data structure is populated with at least a data field stored at the data source.

4. The system of claim 1, wherein the one or more data processors are further configured to:

receive additional or updated characteristics prior to the outputting of the requirements matrix, wherein the project parameters data structure is updated at least based on the additional or updated characteristics.

5. The system of claim 4, wherein multiple additional or updated characteristics are received multiple times prior to outputting the requirements matrix.

6. The system of claim 1, wherein the project prototype is a software product.

7. The system of claim 1, wherein the project prototype comprises a mathematical function.

8. The system of claim 1, wherein the project prototype is further generated based on validated analytical results generated from the data stored in the data source location with the data source name.

9. The system of claim 1, wherein the customized software product is generated to predict events based on the exploratory data analysis of the data stored in the data source location.

10. The system of claim 1, wherein the customized software product generates analytic results from the data stored in the data source location, and the exploratory data analysis identifies an attribute of the data stored in the data source location that is not significant to the generation of the analytic results.

11. The system of claim 1, wherein the one or more data processors are further configured to update the project prototype in a third iteration by performing third exploratory data analysis of the data stored in the data source location with the data source name, wherein the customized software product is further updated based on the project prototype updated in the third iteration.

12. A non-transitory computer-readable storage medium for automated generation of a customized software product encoded with information comprising:

a project parameters data structure, wherein the project parameters data structure includes a plurality of project requirement records, wherein one or more of the project requirement records includes one or more fields identifying a characteristic of the customized software product; and a project prototype; and instructions for commanding one or more data processors to:

receive a plurality of initial characteristics for the customized software product, wherein the initial characteristics comprise a data source name and a data source location;

populate the project parameters data structure at least based on the received initial characteristics;

generate the project prototype by performing exploratory data analysis of data stored in the data source location with the data source name;

output a requirements matrix data structure at least based on the project parameters data structure and the project prototype;

generate the customized software product at least based on the output requirements matrix data structure and the generated project prototype;

receive a second plurality of initial characteristics for the customized software product, wherein the second initial characteristics comprise a second data source name and a second data source location;

update the project prototype by performing second exploratory data analysis of second data stored in the second data source location with the second data source name;

update the requirements matrix data structure at least based on the project parameters data structure and the updated project prototype; and update the customized software product at least based on the updated requirements matrix data structure and the updated project prototype, wherein the update of the project prototype and the update of the requirements matrix data structure occurs in parallel with the generation of the customized software product.

13. The non-transitory computer-readable storage medium of claim 12, wherein the instructions further command the one or more data processors to:
- determine an estimate of value of the customized software product at least based on the project parameters data structure; and
- output the estimate of value with the requirements matrix data structure.

14. The non-transitory computer-readable storage medium of claim 12, wherein a record of the project parameters data structure is populated with at least a data field stored at the data source.

15. The non-transitory computer-readable storage medium of claim 12, wherein the instructions facilitate additional or updated characteristics being received prior to the outputting of the requirements matrix, wherein the instructions command that the project parameters data structure is updated at least based on the additional or updated characteristics.

16. The non-transitory computer-readable storage medium of claim 15, wherein the instructions facilitate multiple additional or updated characteristics being received multiple times prior to outputting the requirements matrix.

17. The non-transitory computer-readable storage medium of claim 12, wherein the project prototype is further generated based on validated analytical results generated from the data stored in the data source location with the data source name.

18. The non-transitory computer-readable storage medium of claim 12, wherein the customized software product is generated to predict events based on the exploratory data analysis of the data stored in the data source location.

19. The non-transitory computer-readable storage medium of claim 12, wherein the customized software product generates analytic results from the data stored in the data source location, and the exploratory data analysis identifies an attribute of the data stored in the data source location that is not significant to the generation of the analytic results.

20. The non-transitory computer-readable storage medium of claim 12, wherein the instructions further command the one or more data processors to update the project prototype in a third iteration by performing third exploratory data analysis of the data stored in the data source location with the data source name, wherein the customized software product is further updated based on the project prototype updated in the third iteration.

21. A method for automated generation of a customized software product encoded with information comprising:
- receiving, by a processor, a plurality of initial characteristics for a customized software product, wherein the initial characteristics comprise a data source name and a data source location;
- populating, by the processor, a project parameters data structure at least based on the received initial characteristics, wherein the project parameters data structure includes a plurality of project requirement records, wherein one or more of the project requirement records includes one or more fields identifying a characteristic of the customized software product;
- generating, by the processor, a project prototype by performing exploratory data analysis of data stored in the data source location with the data source name;
- outputting, by the processor, a requirements matrix data structure at least based on the project parameters data structure and the project prototype;
- generating, by the processor, the customized software product at least based on the output requirements matrix data structure and the generated project prototype;
- receiving, by the processor, a second plurality of initial characteristics for the customized software product, wherein the second initial characteristics comprise a second data source name and a second data source location;
- updating, by the processor, the project prototype by performing second exploratory data analysis of second data stored in the second data source location with the second data source name;
- updating, by the processor, the requirements matrix data structure at least based on the project parameters data structure and the updated project prototype; and
- updating, by the processor, the customized software product at least based on the updated requirements matrix data structure and the updated project prototype,
- wherein the update of the project prototype and the update of the requirements matrix data structure occurs in parallel with the generation of the customized software product.

22. The method of claim 21, further comprising:
- determining an estimate of value of the customized software product at least based on the project parameters data structure; and
- outputting the estimate of value with the requirements matrix data structure.

23. The method of claim 21, wherein a record of the project parameters data structure is populated with at least a data field stored at the data source.

24. The method of claim 21, wherein the instructions facilitate additional or updated characteristics being received prior to the outputting of the requirements matrix, wherein the instructions command that the project parameters data structure is updated at least based on the additional or updated characteristics.

25. The method of claim 24, wherein the instructions facilitate multiple additional or updated characteristics being received multiple times prior to outputting the requirements matrix.

26. The method of claim 21, wherein the project prototype is further generated based on validated analytical results generated from the data stored in the data source location with the data source name.

27. The method of claim 21, wherein the customized software product is generated to predict events based on the exploratory data analysis of the data stored in the data source location.

28. The method of claim 21, wherein the customized software product generates analytic results from the data stored in the data source location, and the exploratory data analysis identifies an attribute of the data stored in the data source location that is not significant to the generation of the analytic results.

29. The method of claim 21, further comprising updating the project prototype in a third iteration by performing third exploratory data analysis of the data stored in the data source location with the data source name, wherein the customized software product is further updated based on the project prototype updated in the third iteration.

* * * * *